Dec. 31, 1935.                H. S. PARDEE                  2,025,889
                          AUTOMATIC BRAKE RELEASE
                          Filed Oct. 4, 1933        4 Sheets-Sheet 1
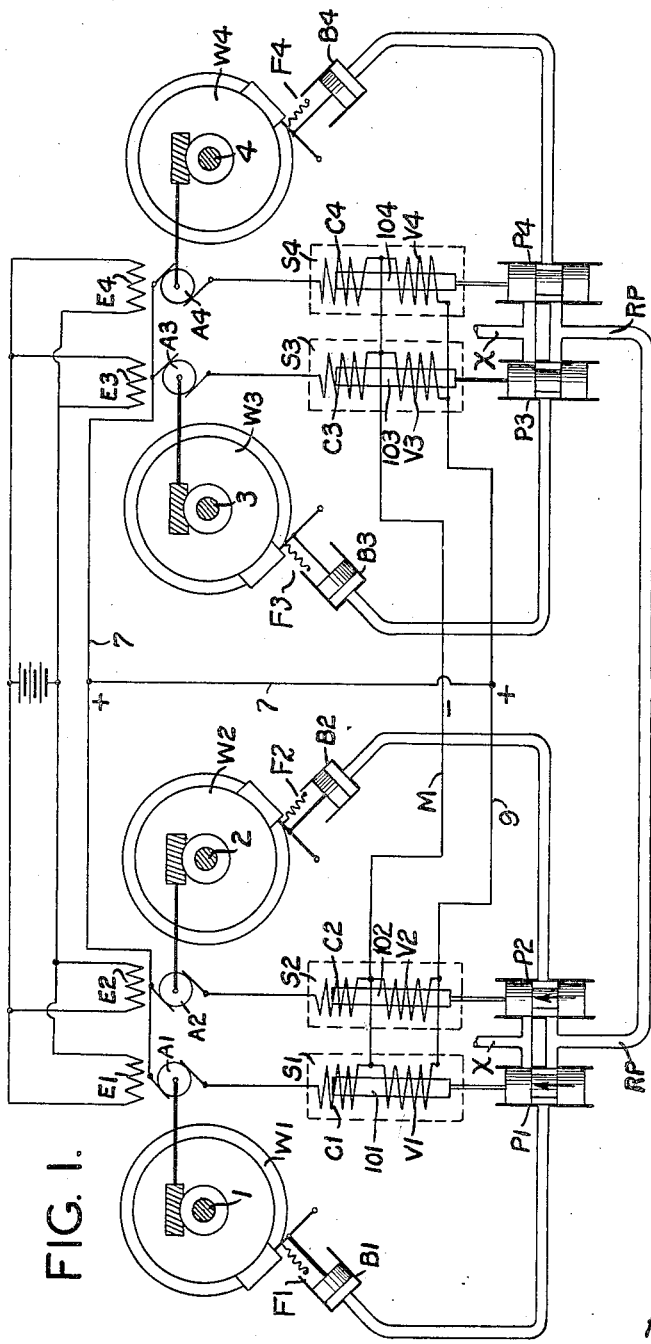
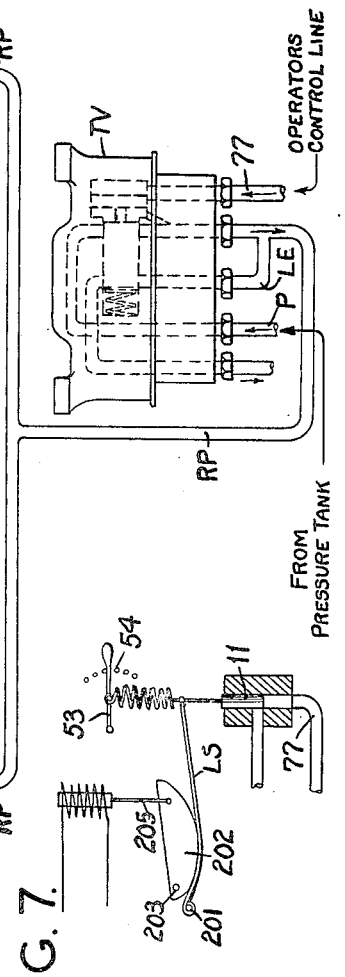
Harvey S. Pardee,
         Inventor.
Delos G. Haynes,
         Attorney.

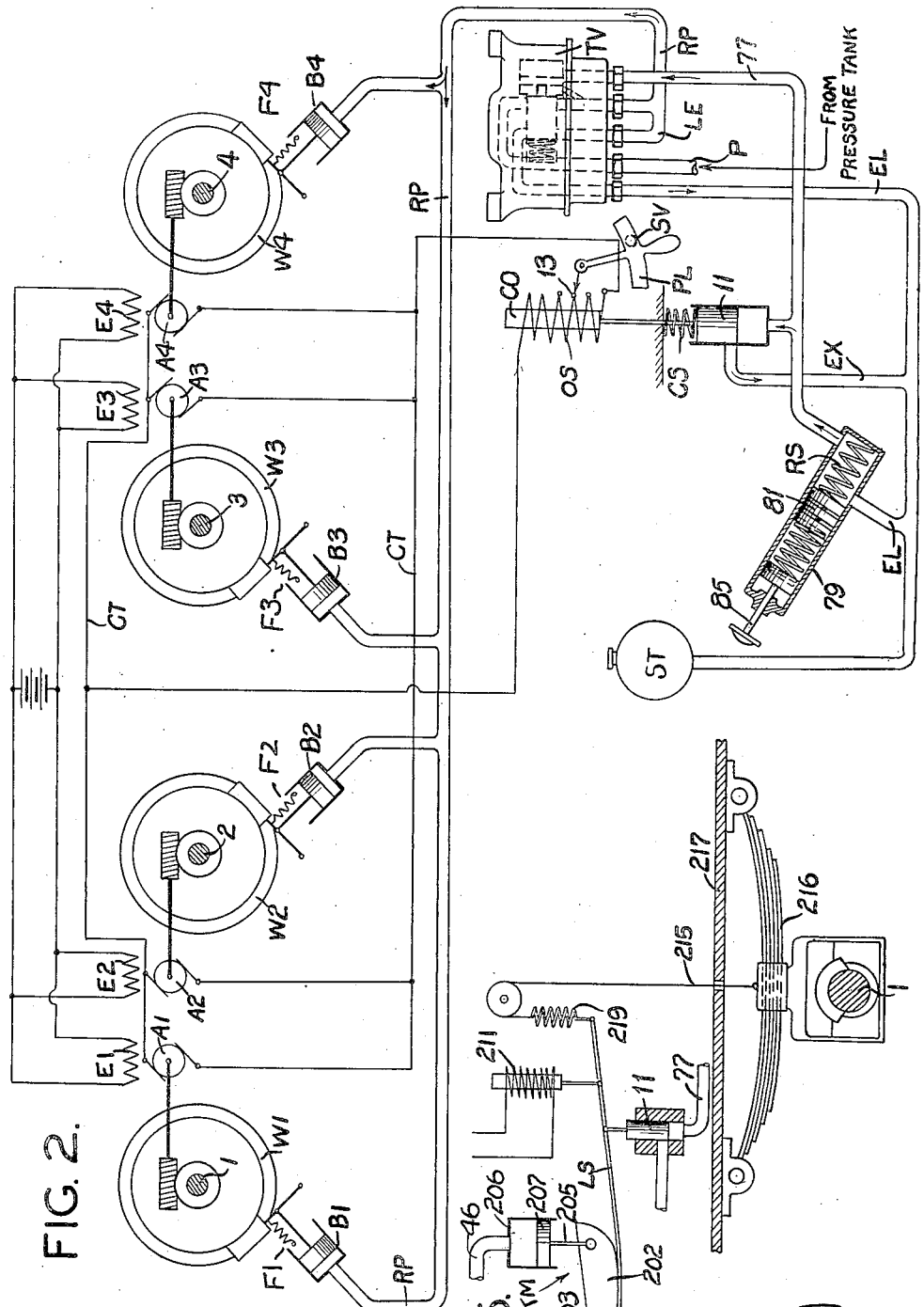

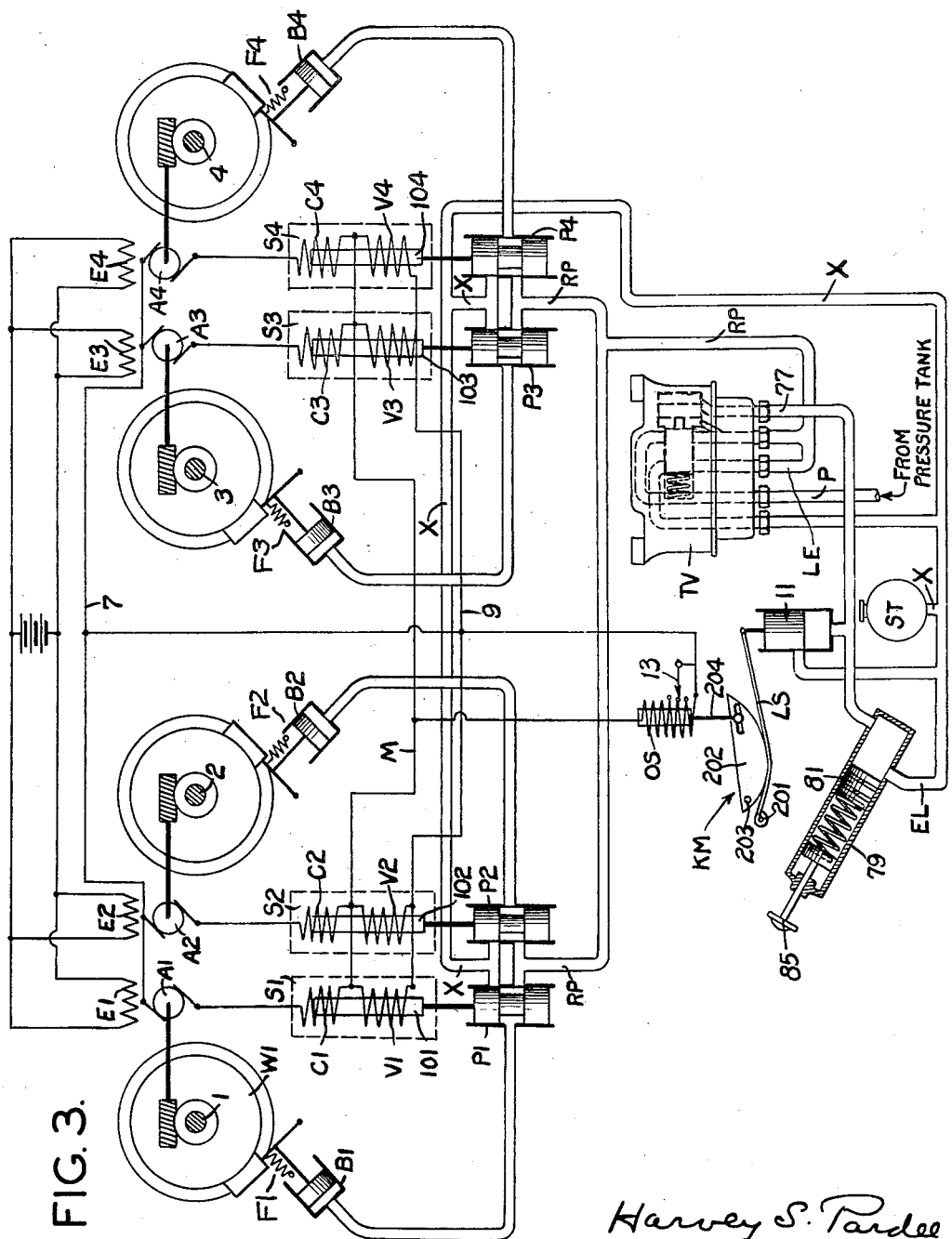

Dec. 31, 1935.    H. S. PARDEE    2,025,889
AUTOMATIC BRAKE RELEASE
Filed Oct. 4, 1933    4 Sheets-Sheet 4
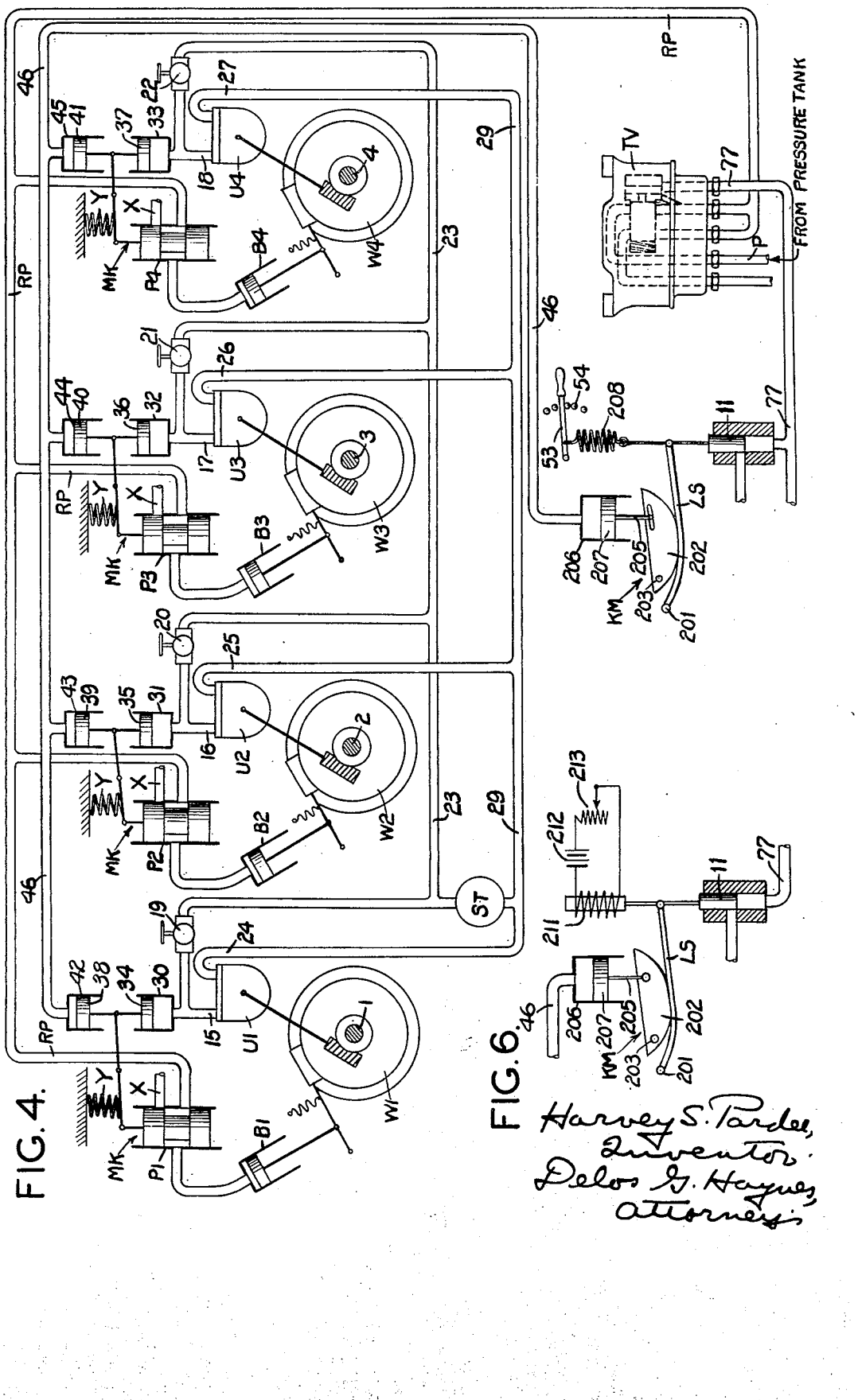

Patented Dec. 31, 1935

2,025,889

UNITED STATES PATENT OFFICE 2,025,889

AUTOMATIC BRAKE RELEASE

Harvey S. Pardee, Ravinia, Ill., assignor, by mesne assignments, to Hydromatic Corporation, Chicago, Ill., a corporation of Illinois Application October 4, 1933, Serial No. 692,142

7 Claims. (Cl. 303—21)

This invention relates to a method of, and apparatus for braking, and with regard to certain more specific features, to such a method and apparatus for use on vehicles or other devices having a plurality of independently movable members which are to be decelerated without locking any of said members.

Among the several objects of the invention may be noted the provision of braking apparatus which shall provide the maximum rate of deceleration obtainable on apparatus to which it is applied; the provision of braking means of this class which shall avoid deleterious locking of the members being decelerated and hence avoid wheel slipping or skidding in the case of vehicles; the provision of apparatus of the class described which provides a smoother and easier stop; the provision of apparatus of this class which shall simplify the operation of brake setting; and the provision of apparatus of the class described which will permit of the use of higher braking pressures at higher speeds and at higher loads. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings in which are illustrated several of various possible embodiments of the invention, Fig. 1 is a diagrammatic layout of one phase of the invention involving what will be referred to as a discontinuous operation;

Fig. 2 is a diagrammatic layout of another phase of the invention involving what will be referred to herein as a graduated operation;

Fig. 3 is a diagrammatic layout showing the combination of features of Figs. 1 and 2 and also a compensator;

Fig. 4 is a diagrammatic layout of a hydraulic form of the invention;

Fig. 5 is a fragmentary view showing another form of compensator;

Fig. 6 is a view similar to Fig. 5 showing another compensator; and,

Fig. 7 is a fragmentary view showing a remote control.

Similar reference characters indicate corresponding parts throughout the several views of the drawings.

In the application of brakes to wheels it is known that the coefficient of brake friction increases rapidly as speed is diminished; and in the case of rail cars running at high speed, a much higher pressure can be used without slipping on the rail, than can be used at low speed. If a high pressure be applied at the start of braking and maintained, a point will finally be reached at which the increased coefficient of friction will cause the brake shoes to seize the wheels, prevent rotation and effect sliding on the rails. The rate of deceleration is then greatly reduced and the desired stop delayed. This argument also applies to non-rail land vehicles.

On the other hand if the initial pressure is low enough to prevent slipping under all conditions, maximum braking will not be effected at the high speeds. This condition is recognized in air brake practice where provision is made for applying full reservoir pressure, say 90 lbs. per sq. in., in emergency braking at high speed, and a normal pressure of, say 50 lbs. per sq. in., when maximum braking is not needed. The 90 lb. pressure may cause slippage at low speeds, whereas the 50 lb. pressure will not generally do so.

In single-stage air compression, pressures much in excess of 90 to 100 lbs. per sq. in., are not practicable although more resulting force than thus provided could be used on the brake shoes at high speeds. Pressures lower than 50 lbs. per sq. in., call for brake cylinders too bulky for convenient use; likewise excessively large brake cylinders are required in the case where more brake shoe pressure is desired from the 90 to 100 lbs. per sq. in. air pressure. In the hydraulic systems such as described in my United States Patent 1,927,752, pressure limitations are not inherent and the maximum pressure available may be conveniently made several times as great as the normal non-slipping service pressure. It is the purpose of this invention to permit the improved application of the said high pressures available in hydraulic and similar systems so as to obtain maximum deceleration at high speeds without the occurrence of wheel slippage under low speed decelerating conditions. In order to make the fastest possible stop, the brake pressure should be kept at all times as great as possible without causing skidding from the highest speed down, and this is accomplished with the present invention.

Referring now more particularly to Fig. 1, numerals 1, 2, 3, and 4, refer to axles of rail car or the like carrying wheels W1, W2, W3 and W4. The axles 1, 2, 3, and 4 drive through suitable gearing the armatures A1, A2, A3, and A4 of electric generators which are preferably, though not necessarily, of the magneto type with permanent field excitation or separate excitation as indicated at E1, E2, E3, E4. The reason for this independent excitation is to avoid the delay in building up voltage incident to shunt wound generators. However, the generators may be the propulsion motors of the vehicle, acting as generators during the braking period.

Solenoids S1, S2, S3, S4, are each provided with two windings C1, C2, C3, C4 and V1, V2, V3, V4, respectively, with equivalent numbers of effective turns and connected in opposition under normal operation so that the solenoid cores 101, 102, 103, 104 are deenergized when all the wheels are turning at substantially the same speed. When the wheels are stationary no current is generated and the solenoids are then also deenergized. Under these conditions brake cylinders B1, B2, B3, B4, which operate brake shoe mechanisms F1, F2, F3, F4 for the respective wheels connected to a given generator, are connected with the source P of brake pressure by way of line RP and valve TV, and also the exhaust line X is shut off. This is effected by valves P1, P2, P3, P4 connected to and under control of the cores of the respective solenoids S1, S2, S3, and S4. When the cores are down (solenoids deenergized) the valves open the source of pressure P to the respective brake cylinders B1, B2, B3 and B4, and when the cores are drawn up (solenoids energized, as will be shown) the valves close off said source of pressure and open the brake cylinders to exhaust X. Any plurality (less than all) or only one brake cylinder may be thus controlled at a given time. It is to be understood that gravity return may be used for the cores 101, 102, 103, 104, as shown, or a spring return (not shown).

Thus, when the respective solenoids are deenergized, the respective valves are in position to supply pressure to the brake cylinders and thus to hold the brakes set, provided the operator so desires. When energized, the valves are drawn up so as to cut off the pressure supply and effect an exhaust of the corresponding brake cylinders and thus to release the respective brakes, irrespective of the operator's intentions.

The current from each generator circulates through both opposed windings of the corresponding solenoid to the bus 9 and thence to the other terminal of the generator over the line 7. The mid-points of connection of the respective pairs of solenoid coils C1—V1, C2—V2, C3—V3 and C4—V4 are connected by a bus M. No current flows in the bus M because the points to which it is connected are at the same potential under normal conditions, the coils C1, C2, C3 and C4 being identical.

When any one (or more) of the pairs of wheels on an axle, with its generator, starts to slip and rotate at a lower speed than the others, its voltage drops and current in the respective series coil C1, C2, C3, or C4, diminishes, and the potential where line M is connected is lowered, and when the drop in speed is such as to lower the generator voltage by the amount of the IR drop in the armatures and series coils, the current in the slow armature becomes zero. Further drop in speed reverses the current in the circuit of the slow armature. The reverse current in the slow armatures is supplied by the other armatures over the bus M flowing through the respective coil C1, C2, C3 or C4. This action unbalances the solenoid connected with the slow armature because the current in the respective coil V1, V2, V3 or V4 is not reversed, the same being supplied from one or more of the other armatures, whereupon the said respective solenoid core becomes energized by the predominating voltage coil V1, V2, V3, or V4, and pulls up the corresponding piston valve P1, P2, P3 or P4, cutting off the pressure to the brake cylinder and connecting the cylinder to the exhaust X. This releases the respective brake or set of brakes and allows the wheel or set of wheels to regain traction at once. The slow generator then comes up to speed equal to that of the others and the solenoid valve is deenergized which again causes application of the brake.

The solenoid and valve are quick acting so that the pressure is discontinuously but very quickly relieved and reapplied with the minimum of wheel skidding. At the same time the solenoid is proportioned so that it will not be energized due to the small amount of unbalancing which would be caused by a difference in speed due only to normal differences in wheel diameters.

Thus it will be seen that any incipient slippage of a wheel or pair of wheels on the rail, immediately results in the brakes on such wheels being relieved and further slipping thus prevented. It will be seen that the pressure source line P leads from the pressure supply by way of any suitable controllable valve such as the self-lapping valve TV whereby a motorman may supply or cut off pressure for gradually setting or releasing the brakes subject, of course, to the above action. The valve TV may be manually operated or hydraulically as from a line 77. This hydraulic operation need not be detailed because it is detailed in said patent (see valve TV and line 77 and description in the patent). This valve TV also controls the release of fluid from the valve cylinders over line LE so that the operator may effect release. For actual details of the valve TV, see said patent and the dotted lines in Fig. 1 herein for diagrammatic construction.

In Fig. 2 is shown another phase of the invention in which is used means for gradually releasing brake pressure on all brakes according to car speed. In Fig. 2, the brake pressure control line 77 is the same as the line 77 of Figs. 6 and 7 of the above patent and the pedal 85, piston 81 and pedal cylinder 79 likewise correspond. Reference to the patent will show that the pedal 85, line 77 and associated parts are used for remotely hydraulically controlling the brake valve TV, said valve TV causing brake pressure setting in line RP proportionately to, but higher than the pressure on the pedal 85. The same system is used herein and need not be again described.

In Fig. 2 the axle driven generators A1, A2, A3, and A4, all feed in parallel to a circuit CT. The coil of a solenoid valve operator OS is connected across this generator circuit and is thus fed by the generators A1, A2, A3, and A4 in parallel. A valve element 11 is mechanically connected to the core CO of the solenoid and is normally held down by a compression spring CS, thus normally closing an exhaust line EX from the pedal control cylinder which leads to a sump tank ST for receiving exhaust liquid. The coil of the solenoid OS is variably shunted by means of variable shunt 13. The action of the solenoid is such that as the current flow increases upon increased speeds of the wheels W1, W2, W3, and W4, core CO is pulled down. Under these conditions the solenoid increasingly aids the spring CS to increasingly cut off the exhaust or resist opening thereof.

On the other hand, depression of the pedal 85 forces down the piston 81 in cylinder 79 against a return spring RS and at the same time piston 81 closes off a line EL, thus to build up pressure in the line 77 and effecting proportional pressure in the brake cylinders by way of valve TV, said pressure coming from the source of pressure P. As the pressure in the line 77 builds up, the valve element 11 is forced back to tend to uncover the exhaust to the tank ST against the action of spring CS and hold down action of coil OS. It will be seen that the faster the wheels W1, W2, W3, and W4 rotate, the more current passes through the coil of solenoid OS and thus the more the valve element 11 depresses and resists opening from pedal 85. It follows that under high speed conditions the pedal 85 may be depressed a greater amount before the valve 11 uncovers the exhaust port to the tank ST and thus greater pressure may be put upon the wheel brakes from source P. On the other hand, when the wheels W1, W2, W3, and W4 slow down, the downward pull on the solenoid OS is reduced, thus causing the valve 11 to less resist opening of the exhaust to the tank ST and preventing the operator from applying the original high pressure, or stating it otherwise, permitting him to set the brakes only with less maximum brake pressure. However, he may vary the brake pressure under the maximum because, as is clear from the construction shown for the valve TV herein and as described in said patent, said valve is self-lapping and effects and holds a brake pressure in proportion to the pressure and displacement placed on pedal 85. TV is a relay for the pressure effected by pedal 85 in line 77. The relayed high pressure in line RP is proportional to the pedal pressure in line 77 and inasmuch as the latter is determined by the speed of the vehicle, decreasing with vehicle speed, the maximum brake pressure decreases with vehicle speed, thus maintaining the vehicle wheels below the slipping point by compensating for the increased coefficient of friction at the low speeds.

The pressure at the source P is the maximum which can be used at the highest speed on a sanded dry rail. In making a fast stop the pedal 85 is depressed the full stroke and applies pressure to the line 77 and hence pressure is applied to the brake line RP. The coil OS is designed to be energized as closely as possible in relation to car speed, and holds the valve 11 closed against pressure equal to that in the pedal cylinder, as long as this pressure is less than at slipping value, but if this pressure is exceeded, the valve lifts and releases enough fluid from the brake line 77 (see line LE) to reduce the brake pressure below the slipping value and this action automatically continues as the car slows down. The action of the solenoid can be reduced to any desired value by opening the shunt switch 13 around some of the turns of the coils and increasing the pull so that less or no liquid is released from the control line 77.

When running on sanded rails higher brake pressures are permissible and this can be provided for by strengthening the pull of the coil S by the switch 13 working in conjunction with a sanding device, the plate PL opening the said valve SV when all of the coil OS is in operation. When running on slippery rails, the operator can manually shunt some of the coil OS so that the standard of pressure will be lowered. Thus the maximum pressure possible to use can be provided under all conditions.

Inasmuch as the liquid released in line 77 must be made up before the next brake pedal operation or otherwise, full pressure application can not be repeated indefinitely without make up. To do this, I provide the arrangement shown wherein the sump tank ST is somewhat elevated above the pedal cylinder and connected by the line EL to the pedal cylinder just inside the position of full release position of piston 81. The spring RS forces out the piston 81, uncovers the port and allows the control line 77 to fill with liquid to normal condition whenever pedal 85 is released.

In Fig. 3 is shown a form of the invention in which is used a combination of the principles set forth in Figs. 1 and 2. Like numerals designate like parts. The coordination is effected by extending the brake line RP of the Fig. 2 form from the valve TV to the solenoid controlled valves P1, P2, P3, and P4, so that the solenoids S1, S2, S3, and S4 through said valves P1, P2, P3, and P4, release the individual brakes when individual slipping occurs by pulling up one or more of said valves P1, P2, P3, or P4 and cutting off the pressure in the brake line RP from the brake cylinder B1, B2, B3 or B4. The exhaust line X is connected with the sump tank ST as shown. The brake cylinders B1, B2, B3, B4 exhaust back through the valves P1, P2, P3, P4, line RP, valve TV and to the sump ST when the valve TV is set to effect exhaust by control of pressure in line 77 from pedal 85. When the brake cylinders exhaust via the auxiliary exhaust X, the exhaust fluid by-passes the valve TV and passes directly to the tank ST, so that the operator cannot block automatic partial brake release. However, when valves P1, P2, P3 and/or P4 are open, the operator may effect exhaust through line LE by operating valve TV.

In Fig. 3 is also shown a method of moving the releasing piston 11 from the solenoid OS by means of a compensator mechanism.

The relationship between coefficient of brake shoe friction and speed may vary considerably from a simple one and to compensate for the departure from simple characteristics, a cam or equivalent may be used between the speed responsive device and the control device to obtain more nearly the relation desired between speed and brake pressure.

In general the relation between coefficient of friction of brake shoes on car wheels with respect to rubbing speeds follows an approximately hyperbolic law. For example, for cars running at 60 M. P. H., the coefficient may be .074; at 10 M. P. H., .242, and at standstill, .33. Furthermore the coefficient diminishes with applied pressure. If then the retarding force is to be kept constant under such conditions the pressure must be increased as the coefficient diminishes with speed and it must be further increased to compensate for drop in the coefficient caused by increased pressure. The true relationship is determined experimentally and laid out on a cam surface, as described below, so that the retardation during braking may be made substantially constant.

As long as the wheel does not skid on the rail the adhesion coefficient between wheel and rail is substantially constant for different speeds. For a clean dry rail, is often taken as .25. On a wet or frosty rail, this may diminish to a value as low as .10, while on dry sanded rail, may be as high as .40. This means that the maximum turning moment due to shoes on the wheel must be kept lower than the turning moment due to adhesion of the wheel on rail but the latter is substantially constant during a braking period as long as the wheel does not skid.

The compensator KM (Fig. 3) consists of a leaf spring LS which takes the place of the spring CS of Fig. 2, pivoted at 201. This spring reacts against a cam 202 pivoted at 203 and is connected with the piston 11. A link 204 connects the core of solenoid OS with the cam 202. As forecast, the cam surface is laid out so that the mechanical advantage of the core of solenoid OS with respect to the piston 11 is variable according to the empirical law of the particular brake system, whereby, as the car slows down the maximum pressure which the operator can apply to the brakes from pedal 85 is just under that which would cause skidding on the rail, in view of all the variables to be considered.

Specifically, friction is caused by the enforced disengagement of the interlocking hills and valleys of the mating surfaces. As the speed increases only the higher projections have time to become interlocked and the surfaces tend to jump between the high spots. At standstill the maximum interlocking takes place and consequently the maximum coefficient of friction. The relation between speed and coefficient is a hyperbolic curve. To compensate for this the pressure must be increased according to a straight line law, that is, according to the inverse of a hyperbola.

The coefficient also diminishes with increase of pressure, because while the interlocking is increased by increased pressure it does not increase in direct proportion and it is found that the coefficient diminishes with pressure according to a parabolic law. This means that to compensate for increased pressure as well as increased speed the pressure must be increased at a rate even faster than is required by the effect of speed.

The coefficient also diminishes also to some extent as a result of continued rubbing, that is, the distance moved after the brakes are applied.

The coefficient also diminishes as a function of the temperature, probably because the surfaces warp and the area in contact is diminished and probably also because the surface is rendered more plastic and melted particles act something as a lubricant.

Now, for a given rail condition and load the coefficient of adhesion between rail and wheel, assuming no slipping, remains practically constant during the braking period. If the tangential force on the brake shoe, which is the same as the retarding force, is to be kept at a maximum, which will be just under the turning moment at point of contact of rail and wheel, then the applied pressure on the brake shoe must be varied to compensate for all the variations in the coefficient of friction of the brake shoe. The law of pressure variation to accomplish this is in general a function of speed.

If the speed responsive device is an electric generator, (Fig. 2) as above set forth, with constant field, the voltage will be directly proportional to speed and if the solenoid valve be designed with a long air gap the pull will vary approximately with the current and voltage from the generator. The design of the cam controlling the valve will then take into account only the compensation for variation in pressure and coefficient of friction; otherwise the other variations must be compensated for.

It is clear that ideal braking calls for adjustment which can be made manually to limit the pressure standard according to the rail condition (see shunt 13, Fig. 2) and automatic adjustment which will vary the pressure according to some inverse function of the speed to compensate for varying coefficient of brake shoe friction during the braking period (see compensator KM, Figs. 3 to 7). The spring CS (Fig. 2) exerts a force on valve 11 to determine the maximum brake pressure at low or zero speeds when the solenoid is nearly or quite deenergized.

In Fig. 4 is shown a modified form of the invention in which a hydraulic, instead of an electrical system is used. In this form pumps U1, U2, U3 and U4 are driven by the respective wheels, the slip of which it is desired to prevent. These pumps have outlets 15, 16, 17, and 18, respectively, pumping a liquid such as oil through adjustable slip or throttle valves 19, 20, 21 and 22 respectively. The valves 19, 20, 21, and 22, deliver to a common header 23, which leads to a sump tank ST. Each respective pump has a suction line 24, 25, 26, and 27, respectively, all leading from a common header 29, which draws from the sump tank ST. The outlets 15, 16, 17, and 18 also lead to cylinders 30, 31, 32, and 33, respectively, having pistons 34, 35, 36, and 37 respectively. The piston 34, 35, 36, and 37 are rigidly or otherwise articulated with the second set of pistons 38, 39, 40, and 41 in cylinders 42, 43, 44, and 45, said cylinders being connected with a common header 46. The pistons are articulated by means of mechanisms MK with valves P1, P2, P3, P4 respectively controlling pressure from the source P to brake cylinders B1, B2, B3, B4.

Normally, all of the pumps U1, U2, U3 and U4, operate at the same speed; that is, when the wheels connected therewith are rolling along the tracks. This means that under equally adjusted conditions of throttle valves 19, 20, 21 and 22, that equal pressures will exist against pistons 34, 35, 36 and 37. Consequently, equal pressures will exist in the cylinders 42, 43, 44 and 45. Under the above conditions, the mechanisms MK will all be in corresponding positions (reaction springs Y having equal tensions) and the respective brake cylinders will be under pressure which will maintain their respective brakes for equal braking on all wheels. However, whenever one of the pumps slows down or stops, due to wheel slippage, the pressure in its outlet will be reduced, and the excess pressure in the respective cylinder 42, 43, 44 or 45, will, under the unbalanced pressure conditions, cause the respective linkage MK to move under action of its spring Y so as to connect the respective brake cylinder B1, B2, B3 or B4 with the respective exhaust X, thus releasing the brake and permitting the respective wheel or wheels to roll, whereupon the pumps will again speed up and reset its linkage MK so as to again admit pressure from the line RP to the respective brake cylinder. Thus far we have a hydaulic analogy to the essential parts of Fig. 1. With this may be combined the compensator mechanism for regulating the pressure on all brakes. This consists in the cam 202 rolling on the spring lever LS which varies the effective leverage of the piston rod 205 acting on the valve 11 so that with low pressure in header 46 the leverage is greater than when the pressure is high. The header 46 is connected with a cylinder 206 which contains piston 207 for moving the cam 202. When the piston 207 is in uppermost position, corresponding to zero pressure in 46 and zero speed, a certain minimum pressure is exerted on LS by KM corresponding to the maximum brake pressure permissible at zero or low speeds. This is true for all the embodiments of the invention involving this feature.

For the valve 11 just to cover the port in control line 77 at low pressure will then require less force in line 77 than it will at high pressures, hence less pressure in brake line RP. The shape of the cam is to be adjusted to give the desired relation. The adjustable tension of spring 208 (Fig. 4) will vary the standard of pressure for all speeds. The adjustable tension is applied to the spring LS by means of a lever 53 adapted to be notched into various positions indicated at 54. Increasing the tension in the spring acts to oppose the action of the piston and lower the pressure standard.

As shown in Fig. 6 a solenoid 211 with battery excitation 212 and variable remote control 213 may be used instead of the mechanical spring 208. The solenoid pull is varied to change the pressure standards for different rail conditions.

If the speed responsive device is a pump as in Fig. 4, with delivery proportional to speed and the pump discharges through a throttling orifice the pressure delivered will be nearly proportional to the square of the speed. In this case the cam must allow for this variation as well as that of varying coefficient and other variables set forth.

It will be understood that the filled header 46 serves both the function of articulating the pistons 38, 39, 40 and 41 and also is that which tensions these pistons and piston 207.

The maximum braking that can be used is limited by rail adhesion and this is a function of two things, load and rail condition. The rail conditions is best compensated manually by the operator who can judge by observation (see shunt 13 (Fig. 2) or lever 53 (Fig. 4) and rheostat 213 in Fig. 6). It is desirable, however, to compensate automatically for variations in load. This hydraulic system provides a way to compensate for all loads in strict proportion to the load.

For this purpose is needed only a mechanical linkage 215 (Fig. 5) between the car spring 216 and body 217 of the car to register the compression of the springs with load and to connect this with a spring 219 connected to the control cam lever to raise the standard of pressure according to the magnitude of the load.

Pull on the cord 215 caused by raising of the body supported on the ends of the car spring on light load pulls on spring LS through coil spring 219 and reduces the force needed in the control line 77 to raise the valve to port open position. This reduces the standard of brake pressure.

Thus the pressure standard is varied according to load as determined by the car spring deflection.

It is here pointed out that the use in Fig. 3 on one set of car wheels of two forms of the invention is consistent. For instance, the use of the graduating pressure releasing system for preventing wheel slipping might not be in proper working order, due to improper setting of the shunt 13 or for other reasons. In such event, the discontinuously operable valves P1, P2, P3, and P4 will insure that any incipient slippage will not continue and become permanent during a given deceleration. The same remarks apply to Fig. 4.

In Fig. 7 like numerals designate like parts. In this illustration the hook-up lever 53 is connected with the plunger 11 by means of a spring for varying the standard of pressure as determined otherwise by the cam linkage.

It is to be understood that the term "current" as used in the claims herein refers to a current of electricity or of fluid and the term "pressure" likewise refers to either electric voltage or fluid pressure.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A braking system for a plurality of wheels or the like, comprising a plurality of fluid pumps driven respectively by said wheels, braking means for the respective wheels, fluid lines associated with said braking means, valves in the respective fluid lines controlling flow of fluid to the braking means and release therefrom, throttled liquid circuits for said pumps, and hydraulic means responsive to the pressures respectively in said circuits engendered by throttling, a common header adapted by said hydraulic means to have pressure engendered therein according to the pressures in said circuits, said circuit pressures being functions of pump speeds, each hydraulic means being independently movable in response to ratios of pressures in said header with respect to that in the respective associated pump outlet, whereby said hydraulic means is moved to control its respective valve.

2. A hydraulic brake system for a plurality of wheels or the like, comprising a plurality of fluid pumps driven respectively by said wheels, braking means for the respective wheels, fluid pressure lines associated with said braking means, brake-control valves in the respective fluid lines controlling flow of fluid to the braking means and release therefrom, liquid circuits connected to said pumps adapted to have pressures respectively engendered therein according to the respective movements of said pumps, a plurality of means responsive to move according to pressures respectively in said respective circuits, each of said movable means being independently movable in response to change in pressure in its respective pump circuit, whereby it is moved to control its respective valve.

3. A braking system for a plurality of wheels or the like, comprising a plurality of fluid pumps driven respectively by said wheels, braking means for the respective wheels, fluid brake lines associated with said braking means, valves in the respective fluid lines controlling flow of fluid to the braking means and release therefrom, throttled liquid circuits for said pumps, and hydraulic means responsive to the pressure respectively in said circuits engendered by throttling, a common header adapted by said hydraulic means to have pressure engendered therein according to the pressures in said circuits, each hydraulic means being independently movable in response to ratio of pressure in said header with respect to that in the respective associated pump outlet, whereby said hydraulic means is moved to control its respective valve, means for simultaneously varying pressures in said fluid brake lines and means responsive to pressure in said header for varying the maximum pressure which may be placed in said brake lines, higher header pressures corresponding to higher speeds and vice versa.

4. A braking system for a plurality of wheels or the like, comprising a plurality of fluid pumps driven respectively by said wheels, braking means for the respective wheels, fluid brake lines associated with said braking means, valves in the respective fluid lines controlling flow of fluid to the braking means and release therefrom, throttled fluid circuits for said pumps, and means movably responsive to the pressures respectively in said circuits engendered by throttling, a common means adapted to be tensioned by said movable means according to the pressures in said circuits, each of said responsive means being independently movable in response to pressure in the respective associated pump outlet, whereby said responsive means is moved when required to control its respective valve, means for varying pressure in said fluid brake lines, and means responsive to tension in said common means for varying the pressure which may be placed in said brake lines.

5. A braking system for a plurality of wheels or the like, comprising a plurality of fluid pumps driven respectively by said wheels, braking means for the respective wheels, fluid brake lines associated with said braking means, valves in the respective fluid lines controlling flow of fluid to the braking means and release therefrom, throttled fluid circuits for said pumps, and means movably responsive to the pressures respectively in said circuits engendered by throttling, a common means adapted to be tensioned by said movable means according to the pressures in said circuits, each of said reponsive means being independently movable in response to pressure in the respective associated pump outlet, whereby said responsive means is moved when required to control its respective valve, means for varying pressure in said fluid brake lines, means responsive to tension in said common means for varying the pressure which may be placed in said brake lines, and means associated with said common tensioned means for varying the standard of pressure in the brake lines.

6. A braking system for a plurality of wheels or the like, comprising a plurality of fluid pumps driven respectively by said wheels, braking means for the respective wheels, fluid brake lines associated with said braking means, valves in the respective fluid lines controlling flow of fluid to the braking means and release therefrom, throttled liquid circuits for said pumps, and hydraulic means responsive to the pressures respectively in said circuits engendered by throttling, a common header adapted by said hydraulic means to have pressure engendered therein according to the pressures in said circuits, each hydraulic means being independently movable in response to ratio of pressure in said header with respect to that in the respective associated pump outlet, whereby said hydraulic means is moved to control its respective valve, means for varying pressure in said fluid brake lines, and means responsive to pressure in said header for varying the pressure which may be placed in said brake lines.

7. A braking system for a plurality of wheels or the like, comprising a plurality of fluid pumps driven respectively by said wheels, braking means for the respective wheels, fluid brake lines associated with said braking means, valves in the respective fluid lines controlling flow of fluid to the braking means and release therefrom, throttled liquid circuits for said pumps, and hydraulic means responsive to the pressures respectively in said circuits engendered by throttling, a common header adapted by said hydraulic means to have pressure engendered therein according to the pressures in said circuits, each hydraulic means being independently movable in response to ratio of pressure in said header with respect to that in the respective associated pump outlet, whereby said hydraulic means is moved to control its respective valve, means for varying pressure in said fluid brake lines, means responsive to pressure in said header for varying the pressure which may be placed in said brake lines, and manual means for varying the standard of pressure in the brake lines.

HARVEY S. PARDEE.